Patented Jan. 17, 1939

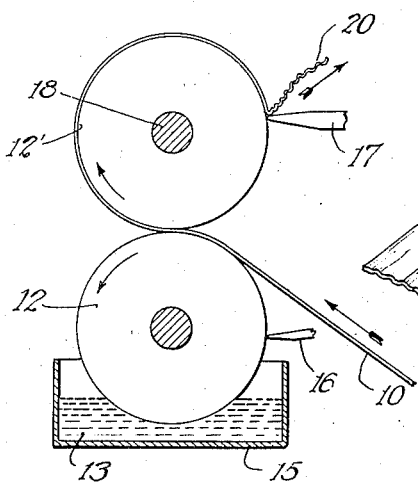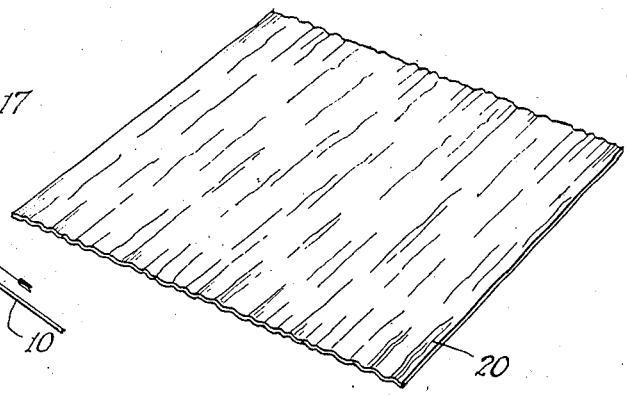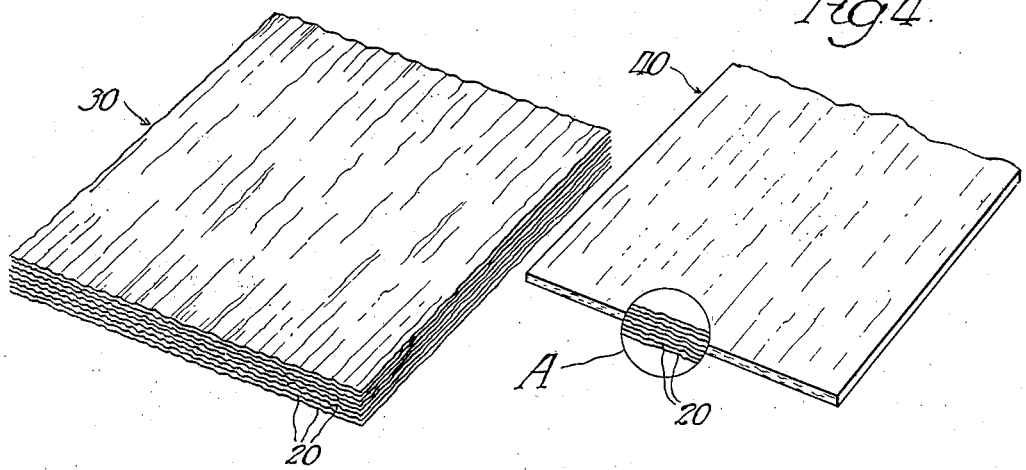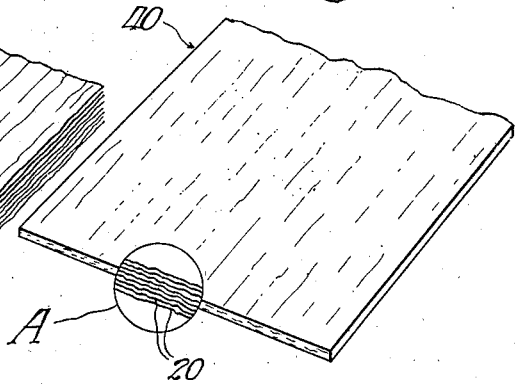

2,143,911

UNITED STATES PATENT OFFICE 2,143,911

METHOD OF MAKING A CELLULOSIC PRODUCT

Charles A. Fourness, Appleton, Wis., assignor to Paper Patents Company, Neenah, Wis., a corporation of Wisconsin Application October 17, 1935, Serial No. 45,407

2 Claims. (Cl. 154—33)

My invention relates to cellulosic products and has to do more particularly with a product made from paper which is suitable for a large number of purposes in the industrial arts. In one form the product may be used for the packing of fragile articles, such as glass, crockery, etc. In another it is useful for heat and sound insulation. In still another form my improved material is valuable as a leather substitute.

Numerous methods have been suggested for the manufacture of artificial leather from cellulose fibers. One method, which is commercially highly successful, is that described in Sewall Patent, No. 1,915,339, dated June 27, 1933. According to said Sewall process, a pad consisting of a plurality of superposed sheets of creped tissue paper is impregnated with rubber latex, and the pad is then compressed and dried.

In accordance with my invention, paper is impregnated with a solution or emulsion of an adhesive or plastic material and then creped, while moist with the impregnating liquid. The sheet may be dried as such or may be wound onto a reel where superposed layers of the impregnated paper will adhere to each other by reason of the adhesiveness of the impregnating material. Said material may then be cut from the reel to form a blanket or pad consisting of a plurality of superposed plies. Said blanket may, if desired, be given any desired degree of compression and then dried.

Single sheets of the impregnated and creped material form excellent packing for fragile articles, since the impregnation combined with the creping produces a high degree of resilience together with high resistance.

Relatively uncompressed or lightly compressed pads comprising a plurality of said impregnated and creped sheets may be used for heat and/or sound insulation. In said pads the individual sheets are firmly adherent to each other by reason of the impregnating material and, hence, there is a high degree of stiffness, while at the same time the numerous air pockets produced by the creping greatly enhance the insulating value of the material.

When said pads are highly compressed they form excellent leather substitutes at least comparable to material produced according to said Sewall process. The combination of creping together with the impregnating material permits a high degree of flexing of the compressed material without danger of splitting or permanent disfiguration, qualities which are found in natural leather but very rarely in leather substitutes.

My invention may be practiced in a number of different modes, but the following are given as examples which have been found especially satisfactory, reference being made to the attached drawing forming a part of this specification, wherein—

Figure 1 is a diagrammatic view in transverse section of apparatus which may be used for practicing my invention;

Figure 2 is a perspective view of a single sheet embodying my invention, the thickness being exaggerated, and Figures 3 and 4 are similar views of multiply embodiments thereof, a portion of Figure 4 being magnified.

A sheet of paper 10 may be run between a pair of metal press rollers 12, 12', preferably hollow, and mounted one above the other, the lower roll 12 dipping into a bath 13 of impregnating fluid, such as rubber latex, asphalt emulsion, etc., in a container 15. The upper roll 12' is preferably manually adjustable by means (not shown) whereby the degree of pressure may be regulated. The lower roll should be driven by suitable means (not shown) while the upper roll may be moved through gears (not shown) by the lower roll. Both rolls may be equipped with doctors, the lower one with a doctor 16 to adjust the amount of impregnating material to be applied and the upper one with a doctor 17 for the purpose of simultaneously creping and removing the web from the roll. The upper roll preferably has a hollow shaft or trunnion 18 so that it may be supplied with either cool water or steam. Where rubber latex is used, the upper roll is preferably maintained at an approximate temperature of 70° F. The impregnating bath may vary considerably in concentration, about 34 per cent being found especially satisfactory.

Creping is preferably accomplished while the sheet is moist with the impregnating material. From the creping roll the creped paper is wound onto a reel, the peripheral speed of which is variable but slower than the peripheral speed of the crepe roll. A speed ratio of 1.00 to 1.75 has been found satisfactory. Doctors are preferably placed on both rolls because, depending upon the nature of the impregnating fluid, and the nature of the paper surfaces, the sheet may follow one or the other roll.

The quantity of impregnating fluid which is applied to the sheet may vary within considerable limits. Generally speaking, it should be sufficient for one creped sheet to adhere to another when a plurality of such impregnated sheets are superposed on each other or, at any rate, when slight pressure is applied. In general, I have found it satisfactory to impregnate with about 15 to 150 per cent solids, based on the weight of the finished sheet.

The stock used, according to my invention, may be paper having a basis weight of from 10 to 40 or 50 pounds per ream (480 sheets, 24" x 36"). However, I do not consider myself limited to such values but may use considerably thinner or heavier stock. It is desired that, when latex is used as impregnating material, the paper should not be acid, particularly when it is desired to impregnate the sheet uniformly throughout. However, a sheet may be acid if only superficial impregnating is desired. In any event, the stock should be reasonably soft and absorbent.

A single creped sheet 20, shown in Figure 2, after drying is highly resilient, promptly resuming its creped form after stretching. Such a sheet is valuable as a packing for fragile articles, such as dishes and glassware.

After the material is wound onto a reel as above described, the pad thus formed may be cut from the reel, say, with 15 or 20 plies, to form a blanket of impregnated and creped superposed sheets. If said material is only slightly compressed and dried, there is produced a mat 30 (Figure 3) of high bulk and fairly rigid structure. This material may be embossed, if desired, to impart additional flexibility and is excellent as an insulating material. Such material, furthermore, is highly resistant to moisture, especially when impregnated with rubber or asphalt.

Said pad may be highly compressed before drying, in which case there is produced an excellent artificial leather 40 (Figure 4). Said material has very pronounced directional rigidity and may be drastically flexed without breaking or separating the fibers at the surface, since, as shown in the magnified portion A, the individual sheets 20 retain much of their creping.

The creping process may be carried out at any time after sheet formation at which the web has acquired sufficient strength to withstand the creping process without rupture or crushing, and while the sheet is still moist. Hence, said impregnation may be performed in connection with a continuous process of paper manufacture. On the other hand, the impregnation and creping may be performed on a completely finished sheet, as described above.

When latex is used as the impregnating material, vulcanizing agents may be added if desired, according to the characteristics desired in the product, and heat may be applied with pressure in compressing the mat.

Also, the impregnating material, either before or after deposition in the sheets may be "activated" by treatment with an organic solvent, such as carbon tetrachloride, benzine, or pine oil, or emulsion of such liquid. Said "activator" increases the tackiness of the rubber, so as to augment the degree of ply adhesion, especially if the sheet is calendered after treatment. The activator may be added to the impregnated material, or the impregnated sheet may be immersed in or sprayed with the activator.

My improved process is especially advantageous in that it is very inexpensive as compared with previously known processes for producing similar goods, requires no expensive special equipment, and utilizes inexpensive raw materials. The product made according to my improved process may, furthermore, be of greater bulk than material made by prior processes.

Various changes and modifications coming within the spirit of my invention will probably suggest themselves to one skilled in the art. Hence, I do not wish to be limited to the precise embodiments described above or uses mentioned except to the extent indicated by the appended claims, which are to be interpreted as broadly as is consistent with the state of the art.

I claim as my invention:

1. The method of making an artificial leather which comprises the steps of impregnating a relatively thin paper with latex adhesive, creping the paper by the action of a doctor blade while the paper is wet with said adhesive, superposing a plurality of layers of the creped paper while still wet with adhesive to provide a laminated pad, compressing the pad to materially reduce the thickness thereof and finally drying the pad.

2. The method of making an artificial leather which comprises the steps of impregnating a relatively thin paper with latex adhesive, creping the paper through the use of said adhesive while the paper is still wet with the adhesive, winding a plurality of superposed layers of the creped paper while still wet with the adhesive upon a reel to form a roll of laminated material, the individual laminations of which adhere to each other due to the presence of the adhesive, removing the material from the reel while the adhesive is still wet, compressing the material, and finally drying the material.

CHARLES A. FOURNESS.